June 4, 1940.   H. A. W. WOOD   2,203,607
WEB SPLICING DEVICE
Original Filed March 11, 1936   7 Sheets-Sheet 1

INVENTOR
HENRY A. WISE WOOD
BY
ATTORNEY

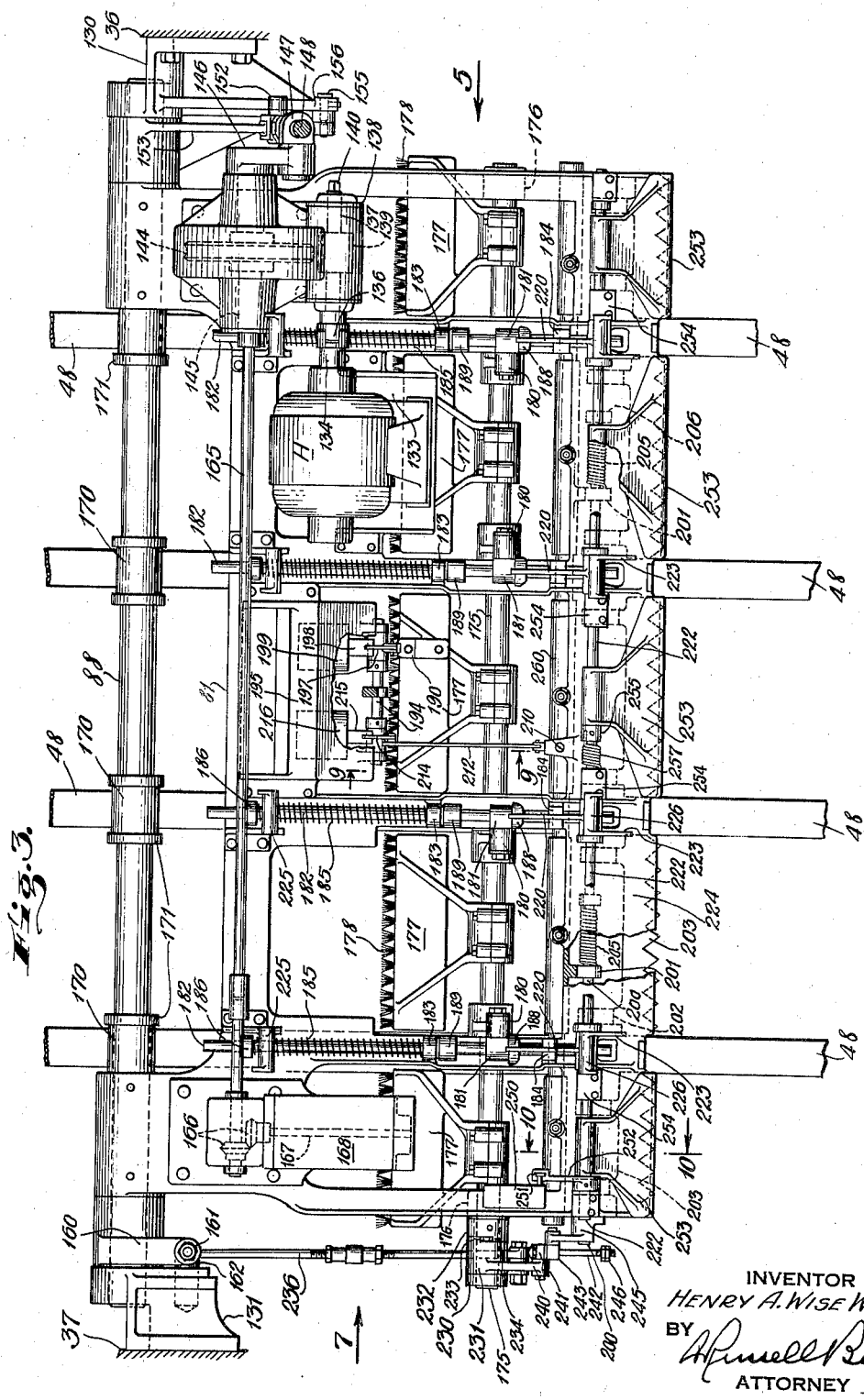

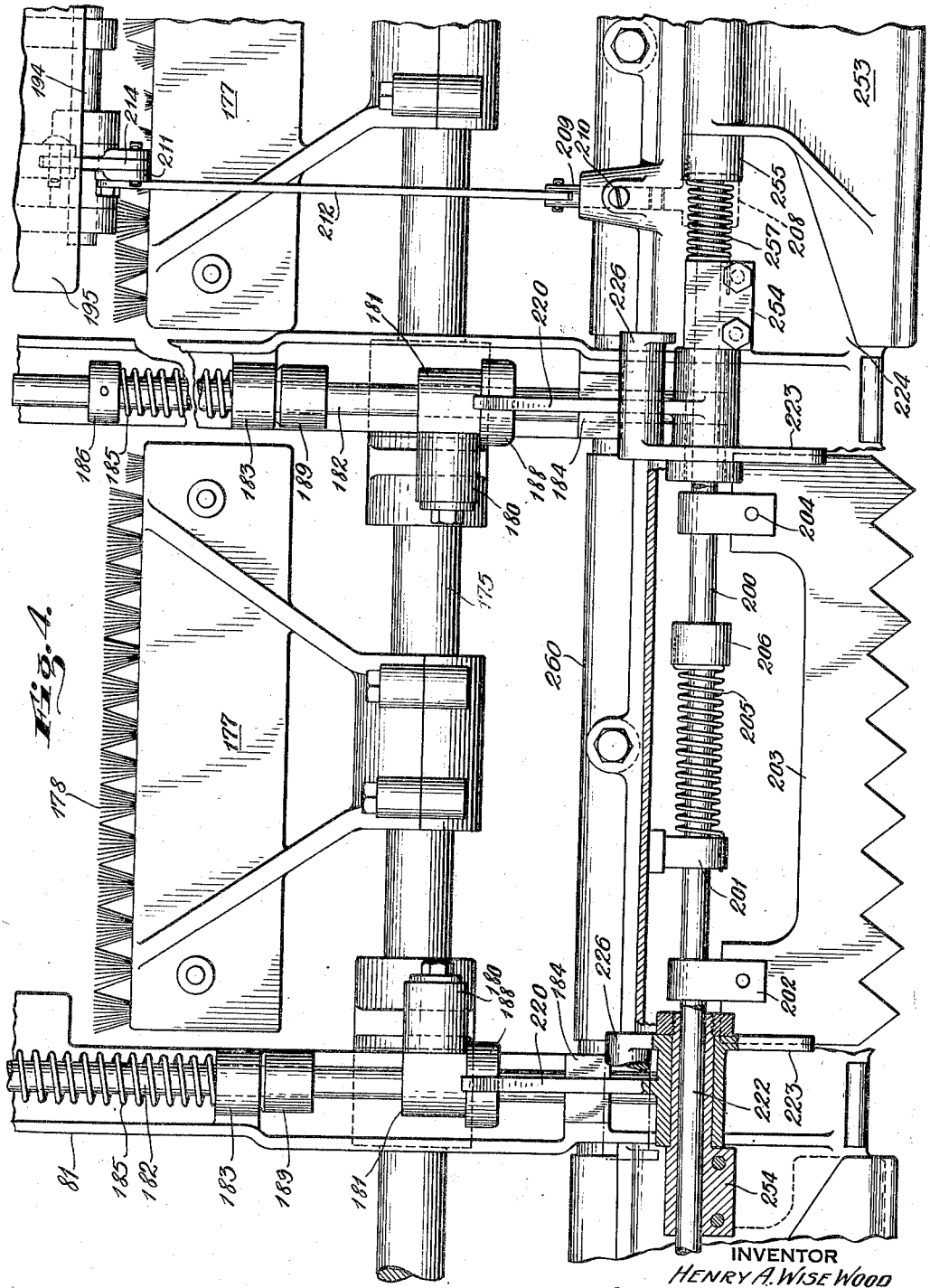

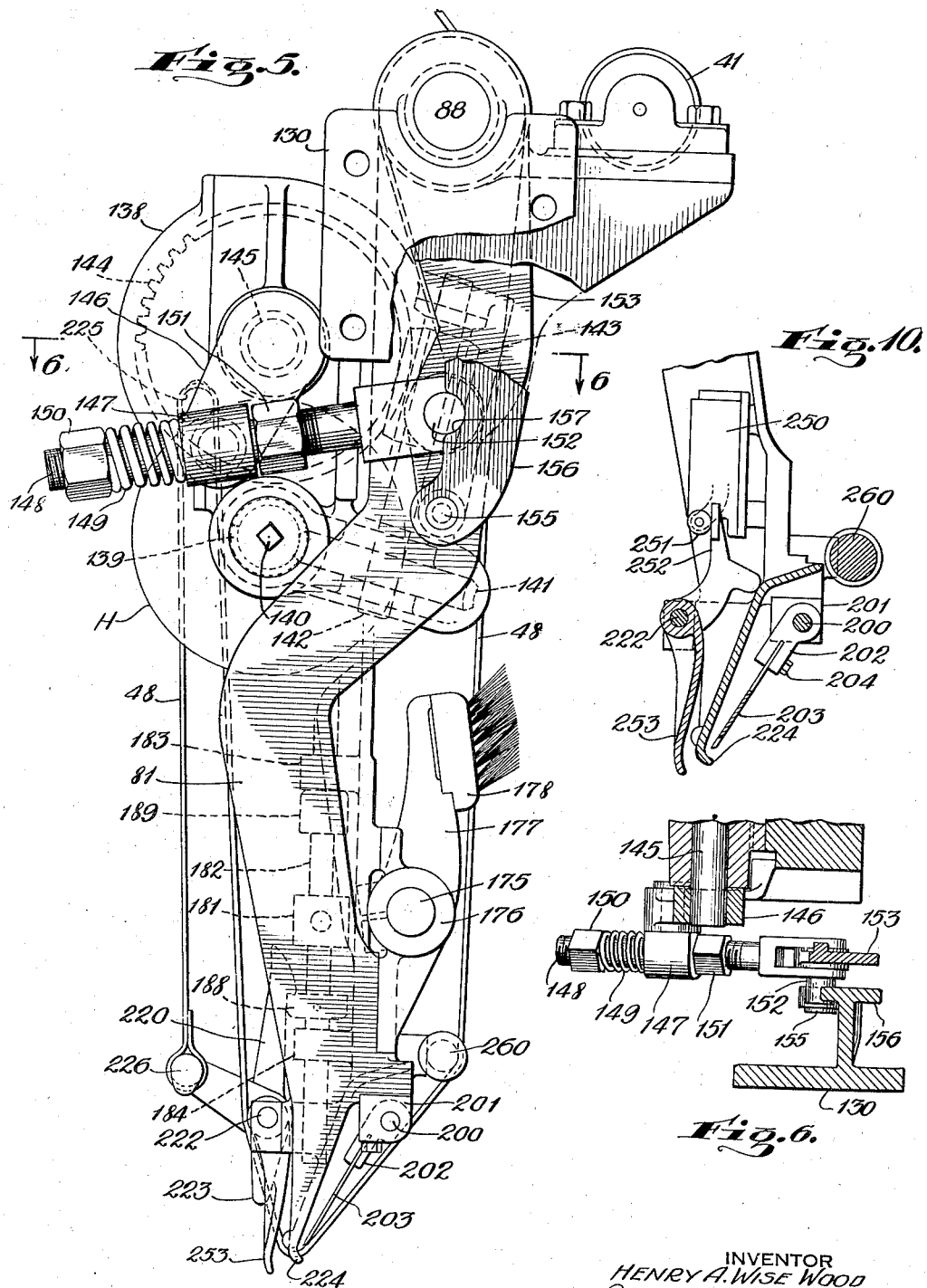

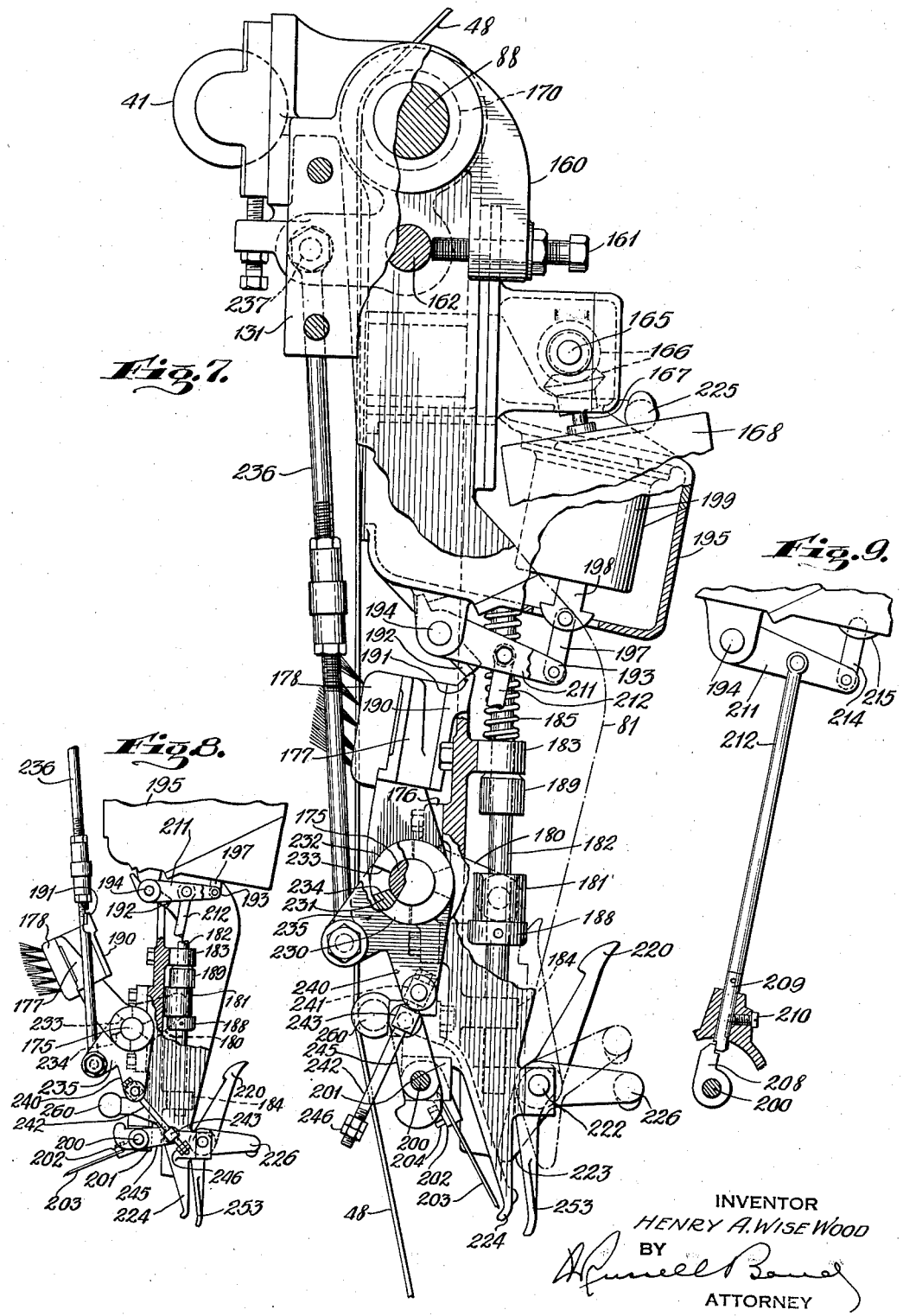

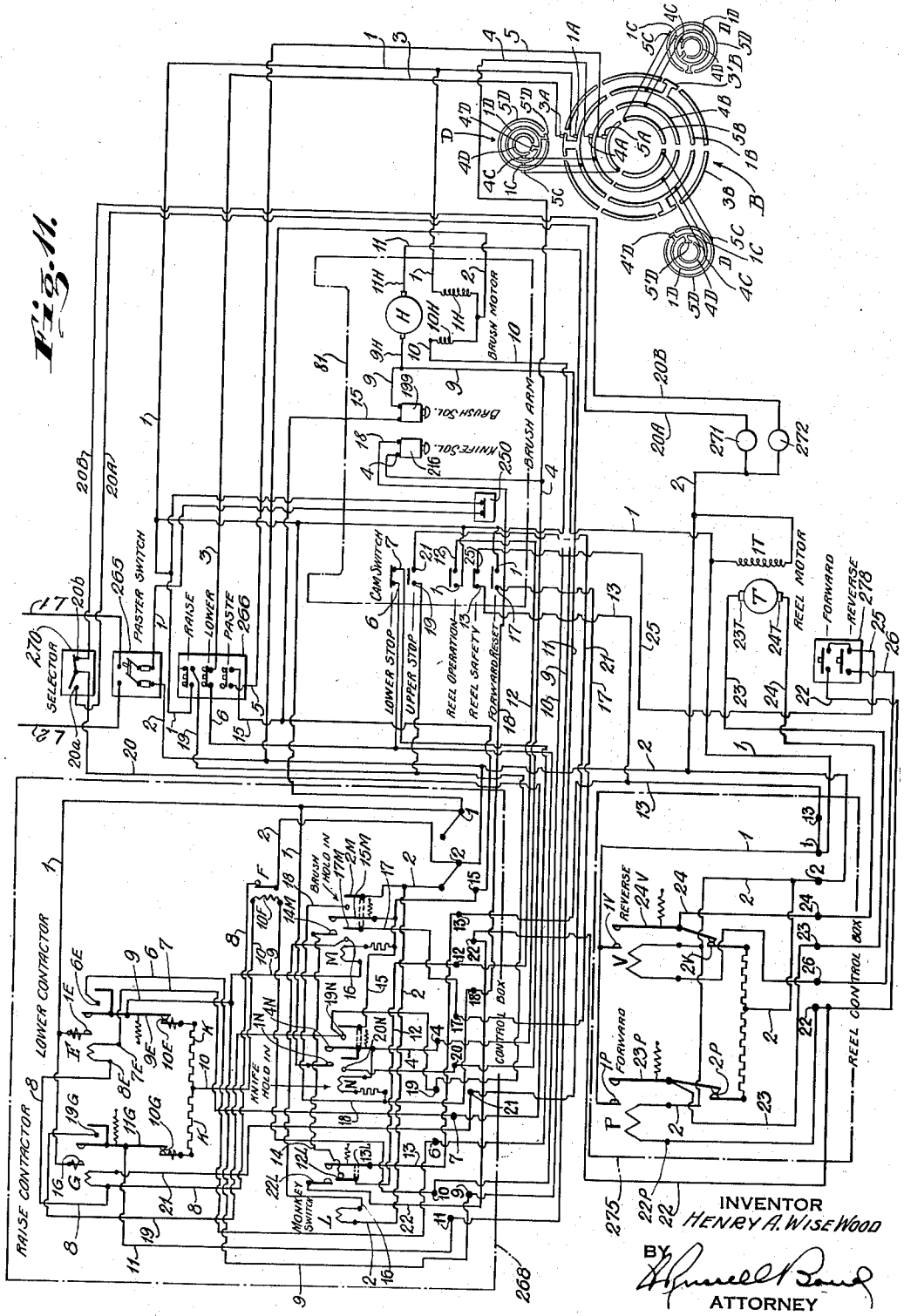

Patented June 4, 1940

2,203,607

UNITED STATES PATENT OFFICE 2,203,607

WEB SPLICING DEVICE

Henry A. Wise Wood, New York, N. Y., assignor to The Wood Newspaper Machinery Corporation, New York, N. Y., a corporation of Virginia Application March 11, 1936, Serial No. 68,340
Renewed September 20, 1939

15 Claims. (Cl. 242—58)

The present invention relates to the art of splicing web rolls and is particularly adapted for use with a newspaper printing press.

In general, the invention relates to web splicing mechanism in which a movable web roll support is adapted to carry a running roll and a fresh roll, with means for speeding up the fresh roll prior to splicing and means operating in timed relation to the rotation of the fresh roll for pressing the running web against the fresh roll to make the splice and then severing the running web from the expiring roll. The splicing mechanism includes a movable frame on which are carried web pressing and severing devices, this frame being movable from an inoperative position to a splicing position, and from the latter position the web pressing and severing devices are operated independently to perform their functions. The mechanism as so far described is similar to that disclosed in my copending applications Serial Nos. 591,077, now Patent No. 2,048,767 of July 28, 1936, and 686,225, now Patent No. 2,148,094 of February 21, 1939, filed February 5, 1932, and August 2, 1933, respectively.

However the present invention embodies certain improvements over the disclosures in said copending applications. The mechanism for moving the frame from inoperative to splicing position and vice versa includes a driving motor mounted on the frame itself. Another feature of the present invention is that the several operations of the splicing cycle are controlled by a multiple switch also mounted on said frame and driven by said motor. Thus the frame is a self-contained unit mounting the splicing mechanism.

Another object of the present invention is to provide improved means for speeding up the fresh roll.

A further object of the present invention is to provide a driving belt for speeding up the fresh roll, such belt being so positioned with respect to the direction of advance of said roll that as the fresh roll is advanced from splicing to running position it will be withdrawn bodily from engagement with the driving belt. One of the drawbacks of roll speeding belts heretofore encountered has been that in advancing the roll it was dragged along the belt and by this dragging motion was over-speeded, thereby paying out the running web and causing slack. This difficulty is overcome in the present invention by locating the driving belt or belts substantially opposite the point toward which the fresh roll is advanced.

Another object of the present invention is to provide safety means for automatically stopping all motion of the splicing mechanism when the moving frame encounters an abnormal obstruction.

Other objects and advantages of my invention will appear in the following description of a preferred embodiment and thereafter the novelty and scope of the invention will be pointed out in the claims.

In the accompanying drawings:

Fig. 3 is an elevation looking in the direction of the arrow 3 of Fig. 1 and illustrating particularly the movable frame which carries the web pressing and severing devices;

Fig. 4 is a view of a portion of Fig. 3 on a larger scale;

Fig. 5 is an edge view of the movable frame and mechanism carried thereby, looking in the direction of the arrow 5 of Fig. 3;

Fig. 6 is a detail view in section taken on the line 6—6 of Fig. 5;

Fig. 7 is an edge view of the movable frame looking in the direction of the arrow 7 of Fig. 3;

Fig. 8 is a view of a portion of the mechanism illustrated in Fig. 7 with certain parts thereof in a different position;

Fig. 9 is a detail view of certain latch mechanism employed to hold the severing means in inoperative position, the view being a section taken on the line 9—9 of Fig. 3;

Fig. 10 is a detail view in section taken on line 10—10 of Fig. 3 and illustrating certain safety mechanism; and Fig. 11 is a diagram of electrical connections.

Figure 1:
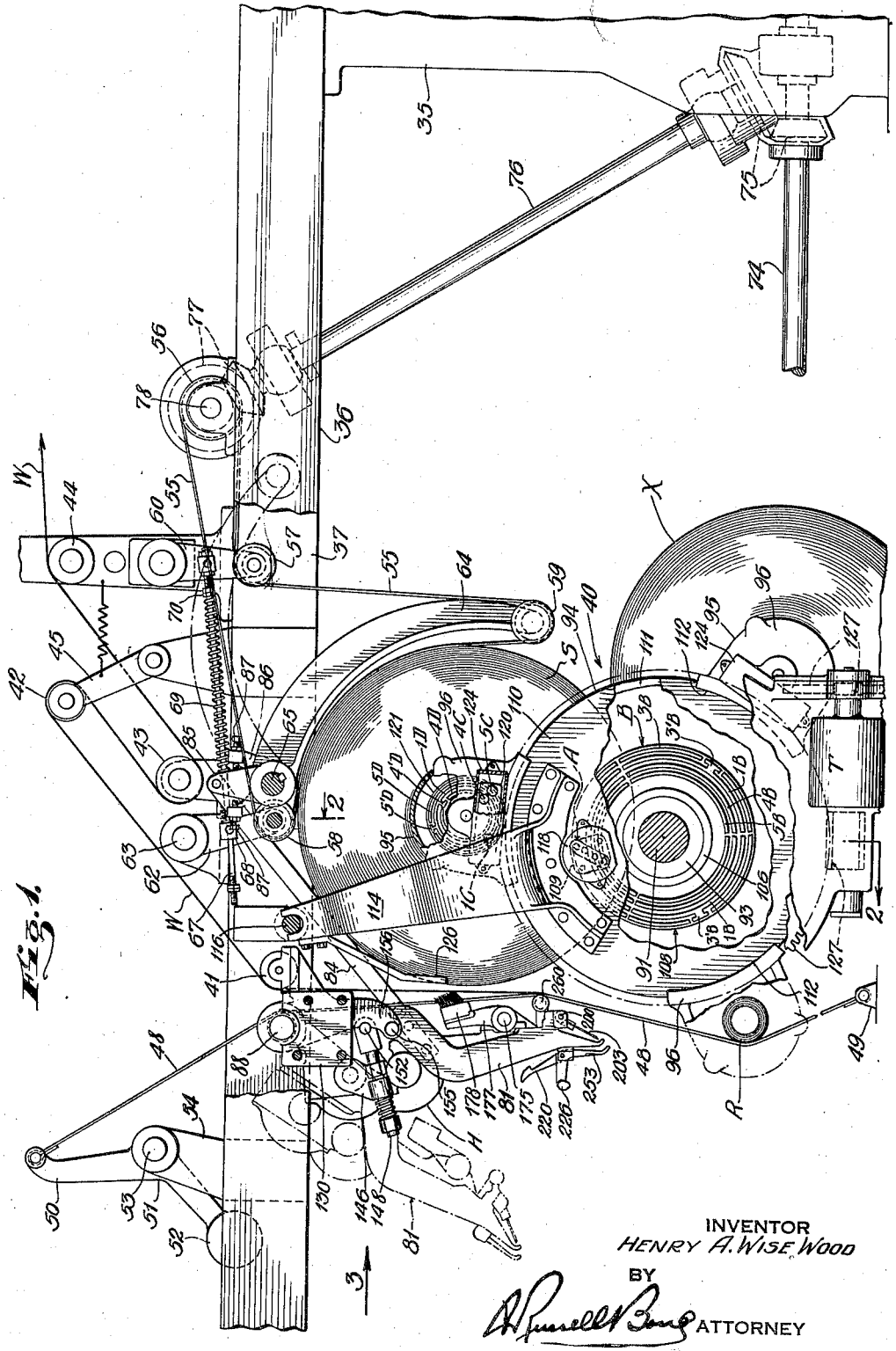
Figure 1 is a view in side elevation of a portion of one end of a web printing press, illustrating a web roll support and splicing mechanism associated therewith, parts of the mechanism being broken away to illustrate details.

A portion of the frame of a web press is shown in Fig. 1, namely, an upright 35 and a pair of side beams 36 and 37. The web W is fed to the press from a running roll R carried by one arm of a three-armed reel 40. A second arm of the reel mounts another roll S to which the web W is presently to be spliced, while the third arm carries a third roll X. The roll R is nearly exhausted and the parts are shown in position preparatory to making a splice between the running web W and the web of the fresh roll S.

It will be observed that the web W passes about a series of idler rollers 41, 42, 43, and 44, and runs thence to the press. The idler 42 is carried by a pair of spring-pressed take-up arms 45 while the rest of the rollers are mounted in fixed journals. In order to exert a braking action on the running roll R, friction straps 48 are arranged to bear against it. These straps are anchored at their lower ends 49 to the floor or to the bedplate of the press and at their upper ends are connected to arms 50 of bell-crank levers 51 whose other arms 52 are weighted so as to keep the straps taut. The bell-cranks 51 are pivoted on a shaft 53 journalled in suitable bearings 54 carried by the frame members 36 and 37.

*Fresh roll drive*

The fresh roll S must be speeded up to the same surface speed as the web W before the splice is made, and to this end, I provide a pair of drive belts 55 which are driven by a pair of pulleys 56, only one being visible in the drawings. Each belt is served by three idlers 57, 58 and 59. The idlers 57 are rotatably mounted on fixed arms 60, but idlers 58 are rotatably mounted on movable arms 62, secured to and depending from a shaft 63 journalled in brackets carried by the press frame. The idlers 59 are rotatably mounted at the extremity of arms 64 which are curved to clear the roll S when the belt is driving said roll. These arms are keyed to a shaft 65 which is suitably journalled in the frame members 36 and 37. In order to keep the belts 55 taut, each movable arm 62 is spring-pressed away from its opposed fixed arm 60. Attached to each arm 60 with a swivel connection is a spring rod 67 that passes through a poppet 68 swiveled upon the opposite arm 62, while a coil spring 69 mounted on this rod is compressed between the poppet 68 and jam nuts 70 threaded upon the rod 67. As will be explained hereinafter the arms 64 are adapted to be swung from the driving position, shown in full lines in Fig. 1, to the idle position shown in broken lines and all the time the belts are kept taut by the springs 69.

The pulleys 56 are driven through suitable gearing by the main drive shaft 74 of the press. As illustrated in Fig. 1, this gearing comprises bevel gears 75 providing a driving connection between the shaft 74 and an inclined shaft 76. The latter through bevel gears 77 drives the shaft 78 on which the pulleys are fixed. By reason of this gearing the belts 55 are given the same surface speed as the web W.

Before a splice is made the leading web edge of roll S is coated with adhesive in the usual manner and the splice is made by pressing the running web against said roll so that it will adhere to and pick up said edge. Immediately thereafter a knife cuts the web W from the expiring roll R and thereafter the web is fed from the fresh roll S. The running web is pressed against the roll S to make the splice, by brushes which are carried in an oscillating brush frame 81 and this frame also carries the knives for severing the web from the expiring roll. The brush frame normally occupies the position shown in broken lines in Fig. 1, but is moved to the position shown in full lines, shortly before the splice is made. As the brush frame moves to the latter position the belt arms 64 are simultaneously swung down to their full line position to contact the driving belt 55 with the roll S and rotate said roll so that its surface speed will be the same as that of the running web W.

After the splice has been made the brush frame 81 and belt arms 64 return to their respective idle positions shown in broken lines. This coaction of the two parts is effected by a link 84 which is connected at one end to the brush frame 81 and at the other to a crank arm 85 journalled upon the shaft 65. A bifurcated bracket 86 is keyed to the shaft 65 and carries opposed adjusting screws 87 which bear respectively against opposite sides of the crank arm 85, so that the position of said crank arm with respect to the belt arms 64 may be adjusted. The brush frame swings on a shaft 88 as an axis and since the link 84 is connected to the brush frame below said axis and to the belt arms above their axis 65, the driving belt 55 will be moved away from roll S as the brush frame rises and toward said roll as the brush frame descends.

*Reel and roll commutators*

Figure 2:
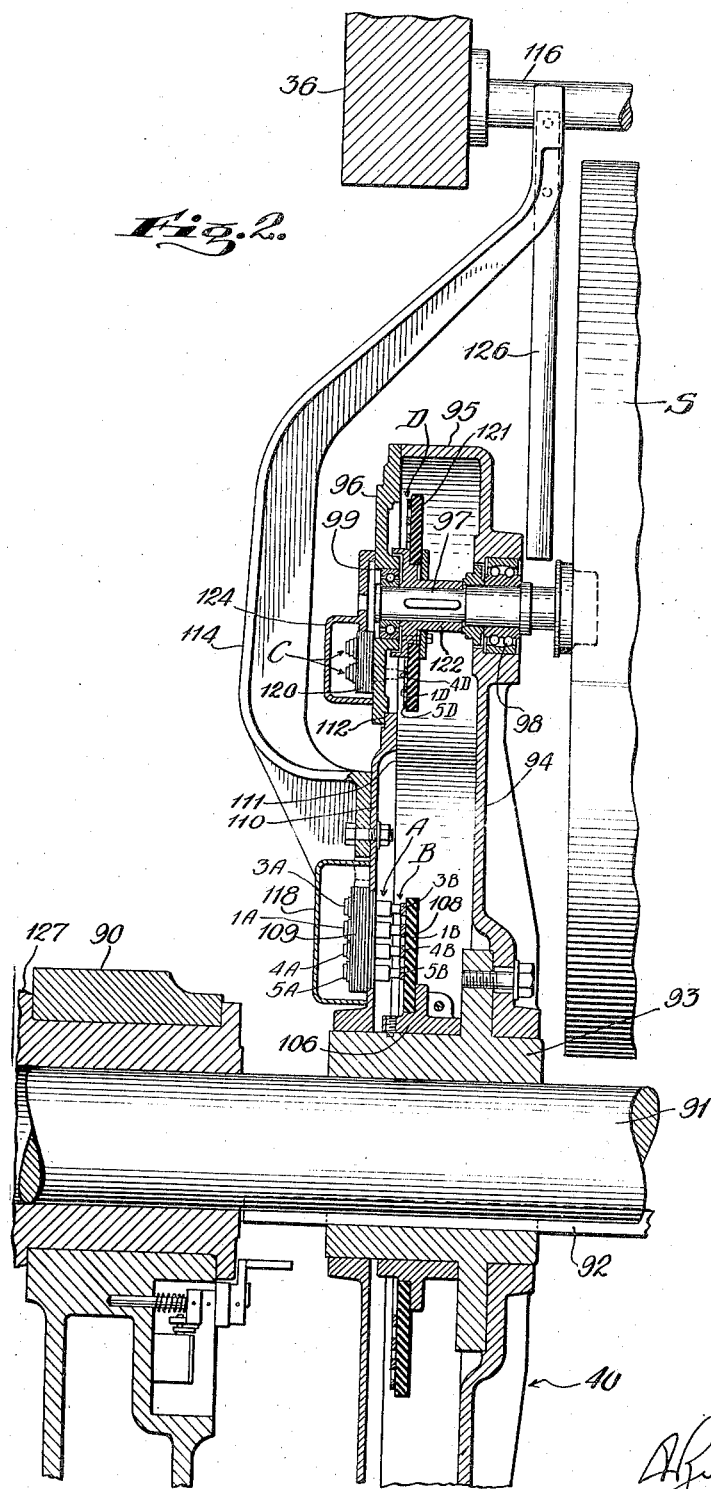
Fig. 2 is a fragmental view in section taken on the line 2—2 of Fig. 1, and illustrating certain commutator mechanism carried by the web roll support for timing the operation of the web pressing and web severing devices with respect to the angular position of the fresh web roll.

Details of the reel 40 are shown in Fig. 2. Journalled in suitable pedestals 90, only one of which is shown, is a shaft 91 of the reel. Only one end of the reel is shown since the other end follows standard practice and need not be described herein. Splined to the shaft 91 by means of a key 92 is a hub 93 to which is bolted a spider 94. The spider has a cup-shaped body with three radially disposed arms 95 of channel-shape in cross-section, with the open side of the cup and channels facing outwardly, as clearly shown in Fig. 2. A cover plate 96 is fitted over the channels of each arm, the cover plate being securely bolted to the arm. A spindle 97 is mounted in ball bearings 98 and 99 carried by the arm and the cover, respectively. The spindle at its inner end is provided with suitable means for engaging the core of the roll of paper mounted thereon. It will be understood that at the other end of the reel there is a similar three-armed spider known as a latching spider, each arm carrying a chuck adapted to engage the core at the adjacent end of the web roll.

It is necessary to correlate the splicing operations of the machine with specific positions of the reel and of the web rolls. Consequently, my invention provides electrical means for securing the desired synchronism of parts. Pinned to the hub 93 is a flanged sleeve 106 which carries the fiber disk 108. Secured to this disk are arcuate commutator strips which in general may be designated by the letter B. These strips are adapted to be engaged by brushes A supported in a fiber block 109, mounted on a fixed plate 110. This fixed plate 110 is journalled on the hub and its outer periphery bears against the rim 111 of the spider body and also fits under a lip 112 of each of the cover plates 96. The plate 110 is kept from rotating by an arm 114 bolted thereto and extending upwardly. The upper end of this arm is bifurcated to engage a shaft 116 supported by the main frame of the press. Thus, although the reel rotates, the plate 110 is kept from rotating. A cover 118 may be provided to protect the fiber block 109 and connections to brushes A. Certain of the commutator strips B are electrically connected to brushes C mounted in a fiber block 120 secured to each cover plate 96 and these brushes in turn engage commutator strips D mounted on a fiber disk 121 secured to a flanged sleeve 122 keyed to the spindle 97. A cover 124 is preferably fitted over the fiber block 120 and brushes C. The relative disposition of the commutator strips and the electrical circuits controlled thereby will be explained more fully hereinafter.

A gauge bar 126 is secured to and depends from the upper end of the arm 114. The purpose of this gauge will be explained hereinafter.

A motor T is operatively connected through suitable gearing 127 (Fig. 1) to the shaft 91, whereby the reel may be rotated to bring successive rolls to splicing and running positions.

The construction of the brush frame 81 is shown in Figs. 3 to 10 inclusive. The brush frame is mounted upon and fixed to the shaft 88. This shaft is journalled in bearings formed in brackets 130 and 131, respectively, secured to the opposite side beams 36 and 37 of the press. The brush frame carries a motor H which operates to swing the frame from one position to another as will now be explained.

Brush frame drive

Referring particularly to Fig. 3, the bracket 133 of motor H is bolted to the brush frame 81. The armature shaft 134 of this motor is connected by a jaw clutch 136 to a short shaft 137. The latter is suitably journaled in a gear box 138 and has a worm 139 fixed thereon. The outer end of shaft 137 projects from the gear box and is squared, as shown at 140, so that it may be turned manually when desired by application of a wrench or crank. The worm 139, as best shown in Fig. 5, drives a worm wheel 141 fixed upon a shaft 142, and fixed to this shaft is a worm 143 which drives a second worm wheel 144. The worm wheel 144 is fixed upon a crank shaft 145 having a crank arm 146 in which is pivoted a poppet 147 (see also Fig. 6). Through the poppet passes a spring rod 148 which mounts a spring 149 compressed between the poppet and a nut 150 threaded upon the outer end of the rod. A nut 151 bearing against the opposite face of the poppet holds the spring in compression. At its inner end, that is the right hand end, as viewed in Figs. 5 and 6, the spring rod is bifurcated to cooperate with a pin 152 which connects the spring rod 148 to a shear pin arm 153. This shear pin arm is mounted to rotate on the shaft 88 and at its lower end is connected by a shear pin 155 to a depending arm 156 of the fixed bracket 130. The pin 152 projects from the spring rod sufficiently to bear against the bracket arm 156, the latter being formed with a depression 157 to serve as a seat for the pin.

It will be evident now that when the motor H is operated, it will rotate the crank shaft 145 in one direction or the other at greatly reduced speed owing to the train of worms and worm gears between the motor and said crank-shaft. If the crank-shaft turns in counter-clockwise direction, as shown in Fig. 5, the brush frame will be swung outwardly or toward the left, as viewed in said figure, owing to the thrust of the spring rod 148 and pin 152 against the shear pin arm 153 and the bracket arm 156. Movement of the motor in the opposite direction will tend to draw the brush frame toward the right, as viewed in said figure, since the spring rod will then pull upon the shear pin arm which is pinned to the fixed arm 156. Should the shear pin be broken, there will be nothing to prevent the brush frame from moving outwardly or toward the left, but it will be prevented from swinging inwardly by engagement of the pin 152 with the fixed bracket arm 156. Thus, there never will be any danger of having the brush arm swing from the dotted position shown in Fig. 1 to the full line position, in case the shear pin should break. And the only movement that the brush arm could make under action of gravity would be to swing away from the reel. The purpose of the shear pin is to prevent breakage of vital parts should the brush arm be swung downward when the fresh roll S is advanced beyond the proper position indicated by the gauge 126.

In order adjustably to locate the operative position of the brush frame, that is the full line position shown in Fig. 1, I provide an arm 160 (Fig. 7) which is fixed to the shaft 88 and carries an adjusting screw 161 threaded therethrough and adapted to engage a pin 162 mounted in the bracket 131. In this way, the lowermost position of the brush frame is fixed, with the spring 149 providing a small amount of leeway.

The crank-shaft 145 is coupled to shaft 165 which extends to the left hand end of the brush frame, as shown in Fig. 3, where it is operatively connected by miter gears 166 to the operating shaft 167 of a set of cam switches enclosed in a casing 168. These switches are arranged to close and open various circuits in predetermined relation to the motion of the brush frame, as will be explained more fully hereinafter.

As also shown in Fig. 3, the shaft 88 is provided with a number of sleeves 170 which freely rotate on the shaft but are kept from endwise movement by collars 171 fixed to said shaft. Over these sleeves pass the straps 48, being guided thereby clear of intervening mechanism.

Brush holders

A shaft 175 is mounted in bearings 176 secured to the brush frame 81. Mounted on and fixed to this shaft is a set of five brush holders 177 each mounting a brush 178. Fixed to the shaft 175 is a set of four arms 180, one between each pair of brush holders, and at the free end of each arm a poppet 181 is pivotally mounted. Each poppet is penetrated by a spring rod 182 which also passes through a pair of spaced poppets 183 and 184 mounted on the brush frame, one above and the other below the poppet 181. A spring 185 is mounted on an upper extension of the spring rod and is compressed between the upper face of the poppet 183 and a collar 186 (Fig. 4) secured adjacent the upper extremity of the spring rod. Between the lower poppet 184 and the poppet 181, a collar 188 is secured to the spring rod and this collar normally bears against the under face of the poppet 181, thereby urging the shaft 175 to turn counter-clockwise, as viewed in Fig. 7. A stop collar 189 secured to and depending from the poppet 183 serves to limit the rise of the poppet 181 and hence limits the angular movement of the shaft 175. Normally, however, the brushes are maintained in their retracted position shown in Fig. 7, until release by mechanism which will now be described.

Bolted to one of the brush holders 177 is a bracket 190 which has a projecting lip 191 normally engaged by a hardened latch 192 fixed to an arm 193 freely rotatable on a shaft 194. The shaft is journaled in brackets depending from a solenoid box 195 which is mounted on the brush frame. The arm 193 is connected at its outer end by link 197 to the armature 198 of a solenoid 199. Thus, when the solenoid is energized by means which will be explained more fully hereinafter, the latch 192 will be withdrawn from the lip 191, permitting the springs 185 to swing the brushes 178 forward to the position shown in Fig. 8. In this position, they press the running web against the fresh paper roll to effect a splice.

Knife holders

Below the shaft 175 is another shaft 200 mounted in brackets 201 secured to the brush frame. Mounted on this shaft are five pairs of knife holders 202. Each holder is bifurcated to receive a knife 203 and the knife is clamped in the holder by means of bolts 204. As shown in Figs. 3 and 4 two torsion springs 205 are mounted on the shaft. Each spring is secured at one end to a collar 206 fixed to the shaft and at the other end engages the adjacent bracket 201. These springs urge the shaft to turn clockwise, as viewed in Fig. 7, and tend to move the knives from the position shown in Fig. 7 to that shown in Fig. 8. However, the knives are normally held in the position shown in Fig. 7 by latch means illustrated in Fig. 9. This latch means comprises an arm 208 fixed to the shaft 200 and engaged by a latch 209. This latch is slidable axially in the brush frame, being prevented from turning by a set screw 210 engaging a keyway in the latch. An arm 211 is pivoted on a shaft 194 and is connected by link 212 to the latch 209. The free end of arm 211 is connected by a link 214 to the armature 215 of a knife releasing solenoid 216, so that when this solenoid is energized the latch 209 will be retracted from the arm 208, releasing the shaft 200 and permitting it to turn under the torsional stress of the springs 205 and swing the knives 203 to the position shown in Fig. 8.

Thus, after the brush frame has been brought to the position shown in Fig. 1, the brushes and knives are swung forward successively under control of the two solenoids to effect the splice and cut the web respectively. As will be explained presently the return of the brush frame to the dotted line position of Fig. 1 serves to reset the brushes and knives to their normal position shown in Fig. 7.

When fractional web rolls are used it is desirable to regulate the pressure of the springs 185 in proportion to the width of the web so as not to exert too heavy a brush pressure against the web. When a full width web roll is used all four of the springs 185 exert pressure on the brushes, but, if, for instance, a ¾ width roll be used it is desirable to make one of these springs inoperative. To this end, I provide four hooks 220, one for each spring rod, to hold the same in depressed position. These hooks are mounted to turn freely on a shaft 222 and are arranged to hook over the collars 188. Each hook has a lower extension 223 which limits rotary motion of the hook, by coming in contact with a knife hanger or guard 224. Fig. 5 shows a hook 220 engaging a collar 188 and holding its rod 182 in depressed position.

When a fractional web roll is used one or more of the straps 48 become idle and must be drawn out of the way. The idle strap is unhooked from its anchorage to the floor and, as shown in Fig. 5, is passed around under the knife hanger; thence it is passed over a bracket 225 near the top of the brush frame and its extremity is hooked to an arm 226 which is fixed to the hook 220. This serves the double purpose of looping up the tension strap and of holding the hook in engagement with the collar 188. This general arrangement is similar to that described in my copending application Serial No. 686,225, filed August 2, 1933.

Resetting Mechanism for Brushes and Knives

The mechanism for restoring the brushes and knives to normal position will now be described. Referring to Fig. 3, it will be observed that the left hand end of the shaft 175 has a retaining collar 230 secured thereto and confining a clutch lever 231 which is loosely mounted on the shaft and cooperates with a clutch 232 fixed to the shaft 175. The clutch lever and clutch have cooperating teeth 233 and 234 (see Fig. 7) which, however, allow sufficient leeway for the brushes to move forward to make a splice. The clutch lever has an arm 235 which is connected by an adjustable link 236 to a stud 237 carried in the bracket 131. The stud is so related to the shaft 88 on which the brush frame swings that when the brush frame is moved from the position shown in full lines in Fig. 1 to that shown in broken lines, the clutch lever 231 will turn the shaft 175 clockwise, as shown in Figs. 7 and 8, and return the brushes from the position shown in Fig. 8 to that shown in Fig. 7. In the latter position the brushes are then held by engagement of the lip 191 with the latch 192.

The same movement is employed to restore the knives from the position shown in Fig. 8 to that shown in Fig. 7. The clutch lever has an arm 240 on which is pivotally mounted a poppet 241. Fixed to this poppet is a rod 242 which passes through a poppet 243 mounted on the end of an arm 245 fixed to the shaft 200. The rod is provided at its outer extremity with a pair of jam nuts 246 which abut the poppet 243 as the brush latch is being reset. As the clutch lever is moved from the position shown in Fig. 8 to that shown in Fig. 7, the rod 242 will transmit motion from arm 240 to arm 245 in such direction as to retract the knives, and the latter will then be held in retracted position as the arm 208 (Fig. 9) snaps past the latch 209. This resetting arrangement is similar to that set forth in my copending application Serial No. 686,225.

It sometimes happens that apparatus of this nature is mounted so that there is little clearance between the brush frame and other parts of the press when the brush frame is in operative position. Since the operation of this device is essentially automatic, it has been found desirable to provide a safety switch 250 whose function will be described hereinafter. As shown particularly in Fig. 10 (Sheet 5) the safety switch is mounted near the free extremity of the brush frame and it has an operating roller 251 arranged to be operated by an arm 252 fixed to the shaft 222. Depending from and fixed to this shaft are several operating members 253, one for each knife. Engagement of any one of these operating members so as to turn the shaft 222 in counter-clockwise direction, as viewed in Fig. 10, will operate the safety switch to open the contacts thereof and thereby stop all motion of the mechanism used in splicing.

The shaft 222 is journalled in the brackets 254 secured to the brush frame (see Fig. 4). A collar 255 is fixed to the shaft. One end of a torsion spring 257, is secured to this collar and the other end engages the bracket 254. This serves to urge the shaft 222 in clockwise direction, as viewed in Fig. 10, so that the safety switch 250 is not operated erratically. A bar 260 is secured to the brush frame and is formed with notches in which the tension straps 48 may rest when the brush frame is in operative position.

Electrical circuits

As shown in Figs. 1 and 11 the reel commutator B comprises sets of concentric arcuate selector strips 5B, 4B, 1B and 3B arranged in sectors of 120 degrees in extent. Each of the outermost strips 3B is formed with a central gap to make room for a radial extension 3'B of strip 1B. These extensions which are insulated from the strips 3B are radially alined with the three reel commutators D. There are four fixed brushes A which are individually designated by the same numbers as the selector strips on which they ride, thus 5A, 4A, 1A and 3A and these brushes are connected to electric conductor lines 5, 4, 1 and 3, respectively. The strips 3B are idlers serving merely as supports for the brushes 3A until such time as the brushes ride off them and upon the extensions 3'B when, it will be observed, the lines 1 and 3 are electrically connected. This electrical connection takes place only when the reel is in any one of three predetermined angular positions, that is with a fresh roll S in the position shown in Fig. 1, and as will be explained hereafter the splicing operation cannot take place unless the reel is thus positioned. The rings 5B, 4B and 1B of each sector are electrically connected by brushes 5C, 4C and 1C respectively, which bear on corresponding selector rings 5D, 4D and 1D of the roll commutators D. The ring 1D of each commutator has an outer projection 5'D which extends into the path of brush 5C and an inner projection 4'D that extends into the path of brush 4C. These projections are insulated from the rings 5D and 4D and are angularly separated somewhat less than 360 degrees in the direction of rotation of the rolls (clockwise, as viewed in Fig. 1) so that at each rotation there will be a momentary electrical connection of lines 1 and 5, followed by a momentary connection of lines 1 and 4 after nearly a full turn has been made by the roll. As will be explained hereinafter the first electrical connection controls the release of the brushes 178 to make the actual splice and the second connection controls the release of the knives 203 to sever the web from the expiring roll.

At a convenient point 265 a switch is provided for connecting lines 1 and 2 to power lines $L_1$ and $L_2$. This switch, known as the "paster switch" is manually closed by the operator when he notes that it is about time to make a splice. Adjacent the paster switch is a push-button station 266 containing three switches known respectively as the "raise" button, "lower" button, and, "paste" button. The first two control respectively the raising and lowering of the brush frame 81 while the last controls the actual pasting of the running web W to the fresh roll S.

Depressing the lower switch electrically connects lines 3 and 6, thereby energizing the coil E of what is known as the "lower contactor". This coil is located in a control box 268, and determines the direction of rotation of the brush frame motor H, causing the brush frame to swing downwardly from the dotted line position of Fig. 1 to the full line position. However, the motor H will not operate in lowering direction if the brush arm is already in lowered position because a "lower stop" switch is automatically opened when the brush arm reaches the lowered position to interrupt the motor circuit. This lower stop switch is one of a set of cam switches in the multiple switch box 168, carried by the brush frame and driven by the motor H, as explained above. This lower stop switch is closed when the brush arm reaches its raised position.

Let us assume that the reel is in the desired position for splicing, shown in Fig. 1, so that line 3 is electrically connected to line 1, and that the brush frame 81 is in its raised position, then on depressing the lower button in the push button station 266 line 6 becomes energized, and since the lower stop switch is closed line 7 also becomes energized. This line 7 leads from the lower stop switch to the control box and thence to terminal 7E of the lower contactor coil E, the other terminal 8E of which is conneced by a line 8 through thermal relay F to the line 2. When coil E is thus energized it attracts an armature 9E which is pivoted intermediate its ends, so that while it makes contact with line 1 at 1E it breaks a lower contact at 10E with a branch of line 10. Line 1 is now connected through the armature 9E to line 9 which runs to one brush 9H of the motor H. The other brush 11H of the motor is connected through line 11 to the armature 11G of a "raise contactor" coil G in the control box 268. This armature is also pivoted intermediate its ends, and as long as the coil G is not energized it connects line 11 to a branch of line 10 at 10G. Each branch of line 10 includes a resistance K. The line 10 may be traced through a thermal coil 10F of the thermal relay F and thence through the series coil 10H of motor H to the line 2. A shunt coil 1H of the motor H is connected across lines 1 and 2. The motor will now rotate in such direction as to lower the brush frame to the position shown in full lines in Fig. 1. As soon as the motor starts the operator may release the lower push button and the lower contactor coil E will continue to be energized because line 6 will now be connected directly to line 1 by way of contact 6E, armature 9E and contact 1E.

When the brush frame has been lowered to the full line position of Fig. 1 the lower stop cam switch is automatically opened, interrupting the energizing circuit of lower contactor coil E and the armature 9E springs back to its normal position shown in Fig. 11, breaking the contacts at 1E and 6E and thereby breaking the circuit through the brush frame motor H. At the same time the armature 9E makes contact at 10E with the adjacent branch of line 10.

Just before the lower stop cam switch opens, another cam switch, known as the "reel operation" switch closes and connects line 1 to line 12. The purpose of this is to condition the parts for certain circuits which will be described hereinafter. Line 12 may be traced to the control box 268 where it terminates in a movable contact 12L carried by the armature 13L of the so-called "monkey switch" coil L. Contact 12L normally engages a line 14 running to a fixed contact 14M in position to be engaged by the armature 15M of a "brush hold-in" coil M when the latter is energized.

When the operator notes that the expiring roll has been reduced in diameter sufficiently, he closes the "paste" button on the control board 266 thereby connecting lines 5 and 15. He holds this button depressed while the fresh roll S makes at least two rotations so as to be sure that the brush 5C contacts projection 5'D and brush 4C contacts 4'D. The momentary connection of lines 1 and 5 through brush 1A, selector strip 1B, brush 1C, selector ring 1D, projection 5'D, brush 5C, selector strip 5B and brush 5A is employed to energize the brush hold-in coil M. The circuit may be traced through the paste button where line 5 is connected to line 15 and the latter runs to the brush hold-in switch, where one branch is connected to the armature 15M and the other through a suitable resistance to one terminal of the brush hold-in coil M, the other terminal of which is connected to line 9. Line 9, as has just been explained, has already been connected by armature 9E to line 10 and the latter has already been traced through series coil 10H of the brush frame motor H to line 2.

Connected in parallel with the brush hold-in coil across lines 15 and 9 is the brush solenoid 199 which is thus energized, attracting its armature 198 and unlatching the brushes 178, which thereupon spring forward under impulse of springs 185 to the position shown in Fig. 8 and press the running web against the fresh roll S. It will be understood that the leading end of the fresh roll has been prepared previously with suitable glue and that the said leading edge has been lightly attached to the body of the fresh roll S so that when the brushes press the running web against the roll S said leading edge becomes attached to the running web.

Although it is but a momentary impulse (as brush 5C rides on projection 5'D) of the roll commutator that initiates energization of the brush hold-in coil M, the latter remains energized by reason of a maintenance circuit controlled by the reel operation switch. This switch, as explained above, connects line 1 to 12 and the latter through the contact 12L on the armature of the monkey switch is connected through line 14 to contact 14M. When the brush hold-in coil is energized, attracting its armature 15M, line 14 is connected by said armature to line 15 and the energizing circuit is maintained after the connection at the "paste" push button between lines 5 and 15 is broken.

Two other circuits are completed by movement of armature 15M in response to energization of the brush hold-in coil M. Line 16 is connected to line 17 and line 18 to line 2. Line 18 may be traced to one terminal of knife hold-in coil N, the other terminal of which is connected to line 4 so that when line 4 is momentarily connected to line 1 as the brush 4C at the roll commutator rides over projection 4'D of ring 1D, this knife hold-in coil N is energized, attracting its armature 4N. This immediately establishes a maintaining circuit by connecting line 4 through said armature to line 1 at 1N. Simultaneously, the armature connects line 15 to line 19 at 19N, and line 4 to line 20 at 20N.

The knife solenoid 216 is connected across lines 18 and 4 in parallel with the knife hold-in coil N so that when said coil is energized a circuit is completed from line 1 to line 2 through the knife solenoid, thereby releasing the knives 203 which are swung forward by their springs 205 to the position shown in Fig. 8, severing the web from the butt of the expiring roll R. This takes place when the fresh roll S has made almost a complete turn after the brushes 178 have made the splice.

Energization of line 20 causes a signal lamp to be lighted to indicate to an attendant at the conveyor that a splice has been made, so that he will be warned to watch for defective copies. A web press may have more than one folder, and since the same folder may not be served all the time, a selector system is provided for lighting a signal at the particular conveyor being served by the folder then in service. The line 20 runs to a selector switch 270 which has two arms so disposed that when one connects with a contact 20a the other is separated from a contact 20b, and vice versa. Lines 20A and 20B run from these contacts to signal lamps 271 and 272 respectively and the circuit through either lamp is complete by a permanent connection to line 2. Obviously, the selector switch could be amplified to take care of more than two lamps if desired. The lamps remain lighted as long as the knife hold-in coil is energized.

Immediately after the knife hold-in coil N is energized the raise contactor coil G becomes energized and starts the motor H in reverse direction, causing the brush frame to return to the dotted line position shown in Fig. 1. Energization of coil G is brought about as follows: It will be noted that the brush hold-in coil M and knife hold-in coil N continue to be energized and the reel-operation switch remains closed. Another of the cam switches known as the "upper stop" switch is also closed, having been moved to closed position shortly after the brush arm started on the downward swing. This upper stop switch connects lines 19 and 21. As has been pointed out above, line 19 is connected to line 1 through the reel operation switch. This connection can be traced from the reel operation switch through line 12 to contact 12L carried by the armature 13L of the monkey switch, thence through line 14 to 14M of the brush hold-in switch where contact is being maintained with line 15 and line 15 is being held in contact with line 19 at 19N by the knife hold-in coil N. Now line 21 runs to one terminal of the raise contactor coil G, the other terminal of which is connected to line 8. As previously explained line 8 is connected through thermal relay F to line 2, so that the circuit through coil G is completed. The armature 11G when attracted by coil G breaks the connection at 10G, disconnects line 11 from line 10 and connects it instead through contacts 1G and 19G to lines 1 and 19. Line 11 runs to the terminal 11H of the motor H and thus line 1 is connected to the motor in reverse to the connection previously made. The other terminal 9H of the motor may be traced to the armature 9E of the lower contactor, and because the coil E is deenergized the contact at 10E is closed connecting lines 9 and 10. Line 10 may be traced through the series coil 10H to line 2. The motor is thus started in reverse direction and raises the arm to the broken line position shown in Fig. 1, where it is stopped by opening of upper stop switch, as will be explained presently.

The splice having now been completed it is desirable to move the newly spliced roll S against the straps 48, therefore shortly after the brush frame has started up from the full line position shown in Fig. 1 another cam switch, known as the "forward reset" switch is automatically closed. This connects lines 1 and 17. The latter has already been connected by energization of the brush hold-in coil M to the line 16 (the connection is actually made by a contactor 17M carried by but insulated from the armature 15M). Line 16 runs to one terminal of the monkey switch coil L, the other terminal of which is connected to line 2. The coil L is thereby energized and its armature 13L connects lines 13 and 22 at 22L, while disconnecting lines 12 and 14 at 12L.

The original maintaining circuit of the brush hold-in coil M was as follows: From line 1 through reel operation switch to line 12 thence through contactor 12L at the monkey switch to line 14, contact 14M, armature 15M, line 15, coil M, line 9, line 10, series coil 10H to line 2. This circuit is interrupted as soon as the monkey switch coil L is energized and breaks the contact at 12L. However, in the meantime, another maintaining circuit was established by energization of the raise contactor coil G, as follows: From line 1 at 1G to armature 11G, contact 19G, line 19, contact 19N, to line 15, thence through coil M as described above. Hence energization of the brush hold-in coil is no longer dependent upon closure of the forward reset switch and the position of the monkey switch armature, but is controlled by the raise contactor, while the knife hold-in coil N remains energized as long as the coil M maintains contact between lines 18 and 2.

Line 13 may be traced to reel control box 275 where it is connected to line 1, while line 22 runs to one terminal 22P of "forward" contactor coil P, the other terminal of which is connected to line 2. The coil P is thus energized, attracting its armature 23P. The latter is pivoted intermediate its ends so that while it connects line 1 to a line 23 at 1P, it also disconnects line 23 from line 2 at 2P. Line 23 runs to brush 23T of the reel motor T, the other brush 24T being connected by a line 24 to line 2. This connection may be traced back by way of armature 24V through normally closed contact at 2V with a branch of line 2. Another branch of line 2 is normally connected at contact 2P to the armature 23P but has now been disconnected therefrom by attraction of coil P. Since the field coil 1T of the motor T is connected across lines 1 and 2 the motor T will be operated in forward direction and will advance the reel in counterclockwise directions, as viewed in Fig. 1, pressing the newly spliced roll S against the tension straps 48. This forward movement of the reel continues during the upward travel of the brush frame until the forward reset switch opens automatically, disconnecting lines 1 and 17, thereby deenergizing the monkey switch coil L, disconnecting lines 13 and 22 consequently deenergizing coil P and reel motor T and causing the reel to come to rest with freshly spliced roll S in proper position against the tension straps.

The brush frame 81 and belt arms 64 are stopped in the dotted line positions shown in Fig. 1 by automatic opening of the upper stop switch, which disconnects lines 19 and 21, deenergizing the raise contactor coil G, and stopping motor H. The maintaining circuit of the coil G, as explained above, includes this upper stop switch connecting lines 19 and 21, 19 being connected by energization of coil G to line 1 at 1G and line 21 being traced through coil G to line 8 and thence to line 2. This dropping out of coil G breaks the maintaining circuit of the brush hold-in coil M by disconnecting lines 1 and 19 at 1G and 19G, and as soon as coil M is deenergized the connection between lines 2 and 18 is broken at 2M, thereby deenergizing the knife hold-in coil N.

For the purpose of testing, a raise button is provided in station 266 for connecting lines 1 and 19 and thereby operating the motor H to raise the brush frame 81 without the necessity of operating the brushes and knives.

A control station 278 is provided for manual control of the reel motor T, a "forward" switch and a "reverse" switch are mounted at this station. The forward switch connects lines 22 and 25, while the reverse switch connects lines 25 and 26. Line 25 which is common to the two switches may be traced back through one of cam switches, known as the "reel safety" switch, to line 13 which is connected to line 1 at the reel control box 275.

The reel safety switch is closed only when the brush frame is in the elevated position shown in broken lines in Fig. 1. So that manual operation of the reel motor is prevented at all other times. When the forward switch is closed, the following circuits are completed: From line 1 through line 13, reel safety switch, line 25, forward switch, line 22, coil P, to line 2. Coil P attracts its armature 23P breaking the contact between lines 23 and 2 at 23P and closing a contact at 1P between lines 1 and 23, thereby supplying current from line 1 to brush 23T of the motor, the other brush 24T being connected through line 24 and contact 2V to line 2. When the reverse switch is closed the following circuits are closed. From line 1, through line 13, reel safety switch, line 25, reverse switch, line 26, coil V to line 2. Coil V attracts its armature 24V, breaking the contact between lines 24 and 2 at 2V and closing a contact at 1V between lines 1 and 24, thereby supplying current from line 1 to brush 24T, while brush 23T is connected through line 23 and contact 2P to line 2.

The safety switch 250 may be connected in series with line 1 below the fuses in the paster switch so that all feeds to line 1 must pass through this safety switch. Hence, opening of the safety switch will cause all moving parts of the mechanism to stop, thereby preventing injury or damage.

*Operation*

The following is a brief description of a cycle of operations:

To prepare for a splice the leading edge of the web on roll S is treated with glue in the usual manner. The operator then manipulates the forward and reverse switches to turn the reel until the periphery thereof is alined with the gauge 126, as shown in Fig. 1. When the depletion of roll R indicates that it is about time to make a splice, the operator closes the paster switch to energize lines 1 and 2 and depresses the lower button. If the reel commutator is substantially in the position shown in Figs. 1 and 11 the lower contactor coil E will be energized, supplying current from line 1 to brush 9H of the brush frame motor H. The other brush 11H being connected through the armature of the raise contactor G to the series coil 10H of the motor to line 2. The brush frame 81 is thereby swung downward to the position shown in full lines in Fig. 1. At the same time the belt arms 59 are lowered to the full line position shown in Fig. 1 because of their mechanical connection to the brush frame. The driving belts 55 are thus partially wrapped about the roll S and start the roll to rotating until its peripheral speed is substantially the same as the surface speed of the running web W. The descent of the brush frame and the driving belts is arrested by automatic opening of the cam switch marked "lower stop."

Everything being now ready for a splice the operator depresses the button marked "paste" and two momentary contacts are closed by the commutator D. The first takes place when brush 5C rides over contact 5'D and the second when brush 4C rides over contact 4'D. The first contact energizes brush solenoid 195 releasing the brushes 178 so that they spring forward under impulse of springs 185 and press the running web W against the fresh roll S. The parts are so timed by the commutator D that the web W is pressed against the roll S just as the leading edge of the roll is about to pass under the brushes. Before roll S has made a full turn the second contact is completed through brush 4C, energizing knife solenoid 216 and thereby releasing the knives 203 which spring forward and sever the running web from the stub of the expiring roll R. Simultaneously, with the operation of the brush and knife solenoids the brush hold-in coil M and knife hold-in coil N, respectively, are energized and are kept closed by self-established maintaining circuits. Since the solenoids are in parallel with their hold-in coils they also remain energized and at the same time a lamp signal 271 or 272 under control of the selector switch 270, warns an operative at a conveyor station that a splice is coming through.

When the knife hold-in contactor is energized coil G of the raise contactor is energized, restarting the brush frame motor H but in reverse and the brush frame is moved upwardly to the dotted line position of Fig. 1. At the same time the belt arms 64 rise to their dotted line position in the same figure. The brush frame motor is stopped at the limit of its upward stroke by the automatic opening of the upper stop switch which interrupts the circuit of raise contactor coil G. This breaks the maintaining circuits of the knife hold-in and brush hold-in coils. At the same time link 236 acting on clutch arm 231 restores the brushes and knives to their normal positions in which they are held by their latches 192 and 209, respectively, now released by the solenoids 199 and 216.

Shortly after the brush frame has started on its upward stroke the reel motor T is automatically operated to turn the reel so that the freshly spliced roll will bear against the straps 48. This movement starts as the result of the automatic closing of the forward reset switch and begins while the belts 55 are still in contact with roll S. Heretofore, when the roll was moved while in contact with a driving belt there was an increase in the peripheral speed of the roll owing to the fact that it was dragged along the belt, thereby producing slack in the running web. In the present case, this difficulty is avoided by locating the driving belt on the opposite side of the roll from the splicing point, so that advance of the roll toward such point will merely withdraw the roll bodily from the belt without dragging it along the belt.

Closure of the forward reset switch energizes the monkey switch L, which energizes the forward contactor coil P and thereby starts the reel motor T in such direction as to turn the reel in counterclockwise direction, as viewed in Fig. 1. The reel continues to turn until the forward reset switch is automatically opened, breaking the circuit through coil L and thereby deenergizing coil P and motor T. The roll S is thus brought to a position in which its rotation is properly braked by the straps 48. The cycle of operations is brought to completion when the brush arm is stopped in its raised position by the automatic opening of the upper stop switch, as described above, and the control equipment is then ready for another cycle as soon as the next splice is demanded.

It will be noted that since the brush frame mounts its own motor and cam switches, said frame is a complete self-contained unit which may be applied as a unit to an existing press or be replaced with another unit in case of need. It will be noted further that the gauge 126 always lies near the edge of the web roll regardless of any shift of the roll for side register or in cases where short rolls are used since this gauge moves with the spider 94 which carries one end of the roll.

While I have described a preferred embodiment of my invention it will be understood that this is to be taken as illustrative and not limitative of my invention and that I reserve the right to make various changes in form, construction and arrangement of parts without departing from the spirit and scope of my invention as pointed out in the following claims.

I claim:

1. In a device for splicing a running web to a web roll, web pressing means, a main frame, a support for said means mounted on said frame and movable between idle and splicing positions, a reversible motor carried by the support, propelling gear driven by the motor and also carried by the support, said gear being adapted to react against the frame to move the support toward and from a splicing position in accordance with the direction of rotation of the motor.

2. In a device for splicing a running web to a web roll, web pressing means, a main frame, a support for said means mounted on said frame and movable between idle and splicing positions, a reversible motor carried by the support, propelling gear driven by the motor and also carried by the support, said gear being adapted to react against the frame to move the support toward and from a splicing position in accordance with the direction of rotation of the motor, control means carried by the support and driven by the motor for stopping the motor when the support reaches either of said positions, and manually controlled means for restarting the motor in opposite direction after it has been in either of said positions.

3. In a device for splicing a running web to a fresh web roll and severing the web from an expiring roll, a main frame, and a self-contained splicing and severing unit mounted on the frame and movable from a normal idle position to a splicing position and back to said idle position, said unit including means for pressing the web against the fresh roll when the unit is in splicing position and means for thereafter severing the web from the expiring roll, said unit comprising also a reversible motor movable with said unit, gearing driven thereby and adapted to react against the frame to effect the movement of the unit and control means for the motor driven by the motor.

4. In a device for splicing a running web to a fresh web roll and severing the web from an expiring roll, a main frame, a self-contained splicing and severing unit mounted on the frame and movable between a normal idle position and a splicing position, said unit including means for pressing the web against the fresh roll when the unit is in splicing position, and means for thereafter severing the web from the expiring roll, said unit comprising also a reversible motor movable with said unit and gearing driven thereby in one direction to push the unit to idle position by thrust engagement with the frame and in the opposite direction to pull the unit to splicing position by a pulling connection with the frame, said connection including a shear pin yieldable to a predetermined pulling strain.

5. In a device for splicing a running web to a fresh web roll and severing the web from an expiring roll, a main frame, a self-contained splicing and severing unit mounted to swing on the frame between a normal idle position and a splicing position, said unit including means for pressing the web against the fresh roll when the unit is in splicing position, and means for thereafter severing the web from the expiring roll, said unit comprising also a reversible motor movable with said unit and gearing driven thereby in one direction to push the unit to idle position by thrust engagement with the frame and in the opposite direction to pull the unit to splicing position by a pulling connection with the frame, said connection including a shear pin yieldable to a predetermined pulling strain.

6. In a device for splicing a running web to a fresh web roll and severing the web from an expiring roll, a main frame, a self-contained splicing and severing unit mounted to swing on the frame between a normal idle position and a splicing position, said unit including means for pressing the web against the fresh roll when the unit is in splicing position, and means for thereafter severing the web from the expiring roll, said unit including also a reversible electric motor, and driving gear operated thereby and reacting against the frame to swing the unit from each of said positions to the other, electric circuits controlling the motor and switches also carried by said unit and operated by the motor in mutually timed relation for controlling said circuits.

7. In a device for splicing a running web to a fresh web roll and severing the web from an expiring roll, a main frame, a support movable on the frame between idle and splicing positions, a reversible motor, propelling gear driven by the motor and reacting on said frame to move said support, control means driven by the motor for stopping the motor when the support has reached either of said positions, manually controlled means for starting the motor in forward direction to advance the support to splicing position, web pressing means mounted on the support, means actuable under manual control to operate the pressing means when the support is in splicing position and the roll is in predetermined angular position to press the running web against the fresh web roll, web severing means mounted on the support, means timed to the operation of the web pressing means for operating the severing means to sever the web from the expiring roll, and means controlled by operation of the severing means for starting the motor in reverse direction, said motor, gear and motor driven control means being mounted on the support.

8. In a device for splicing a running web to a fresh web roll and severing said web from an expiring roll, a support for the fresh roll, a frame movable between an idle position and a splicing position adjacent said fresh roll, web pressing and severing means carried by the frame and operable to press the web against the fresh roll and sever the web from the expiring roll, power driven means for moving the frame to splicing position, and safety means for stopping the power driven means in case the frame encounters an obstruction in its movement.

9. In a device for splicing a running web to a fresh web roll and severing said web from an expiring roll, a support for the fresh roll, a frame movable between an idle position and a splicing position adjacent said fresh roll, web pressing and severing means carried by the frame and operable to press the web against the fresh roll and sever the web from the expiring roll, a reversible electric motor mounted on the frame, driving gear driven by the motor for moving the frame, an electric energizing circuit for the motor including a safety switch, and trips carried by the frame and adapted upon encountering an obstruction to open said switch and stop the motor.

10. In a device for splicing a running web to a fresh web roll and severing said web from an expiring roll, a support for the fresh roll, a frame movable between an idle position and a splicing position adjacent said fresh roll, web pressing and severing means carried by the frame and operable to press the web against the fresh roll and sever the web from the expiring roll, an electric motor mounted on the frame, means driven by the motor for moving the frame from either of said positions to the other, electric control means for the motor and the web pressing and severing means, means for supplying said motor and said control means with electric current, a safety switch for interrupting said current, and trips carried by the frame, said trips being adapted upon encountering an obstruction to open said switch and interrupt said current.

11. In a device for splicing a running web to a fresh web roll and severing the web from an expiring roll, a main frame, and a self-contained splicing and severing unit mounted on the frame and movable between a normal idle position and a splicing position said unit including means for pressing the web against the fresh roll when the unit is in splicing position, and means operable in timed relation to the pressing means for severing the web from the expiring roll, said unit comprising also a motor movable with said unit and driving gear adapted to react against the frame to move said unit from idle position to splicing position and vice versa.

12. In a device for splicing a running web to a web roll, a rotatable reel providing an axially adjustable mounting for a roll, a gauge maintained at a fixed angular position with respect to the reel and clear of the path of the roll as the roll is moved by rotation of the reel, said gauge indicating a predetermined splicing position of the roll when the periphery of the roll is alined therewith, means for rotating the reel to adjust the roll to said position, and means compelling the gauge to follow axial adjustments of the roll so that the gauge will at all times lie close to said path.

13. In a device for splicing a running web to a fresh web roll and severing said web from an expiring roll, a support for the fresh roll, a frame movable between an idle position and a splicing position adjacent said fresh roll, web pressing and severing means carried by the frame and operable to press the web against the fresh roll and sever the web from the expiring roll, power driven means for moving the frame to splicing position, and safety means for stopping the power driven means as it is moved away from the roll and toward idle position in case the frame encounters an obstruction in its movement.

14. In a device for splicing a running web to a fresh web roll and severing said web from an expiring roll, a support for the fresh roll, a frame movable between an idle position and a splicing position adjacent said fresh roll, web pressing and severing means carried by the frame and operable to press the web against the fresh roll and sever the web from the expiring roll, power driven means for moving the frame to splicing position and away from said position to idle position, and safety means for stopping the power driven means as it is moved toward and away from the roll in case the frame encounters an obstruction in its movement.

15. In a device for splicing a running web to a fresh web roll and severing said web from an expiring roll, a support for the fresh roll, a frame movable between an idle position and a splicing position adjacent said fresh roll, web pressing and severing means carried by the frame and operable to press the web against the fresh roll and sever the web from the expiring roll, a reversible electric motor mounted on the frame and movable therewith, driving gear driven by the motor for moving the frame, an electric energizing circuit for the motor including a safety switch, and trips carried by the frame and adapted upon encountering an obstruction to open said switch and stop the motor.

HENRY A. WISE WOOD.